Aug. 1, 1961 P. S. OSBORNE 2,994,228
SELF-REGULATING PULLEY TRANSMISSION SYSTEM
Filed Oct. 9, 1958 2 Sheets-Sheet 1
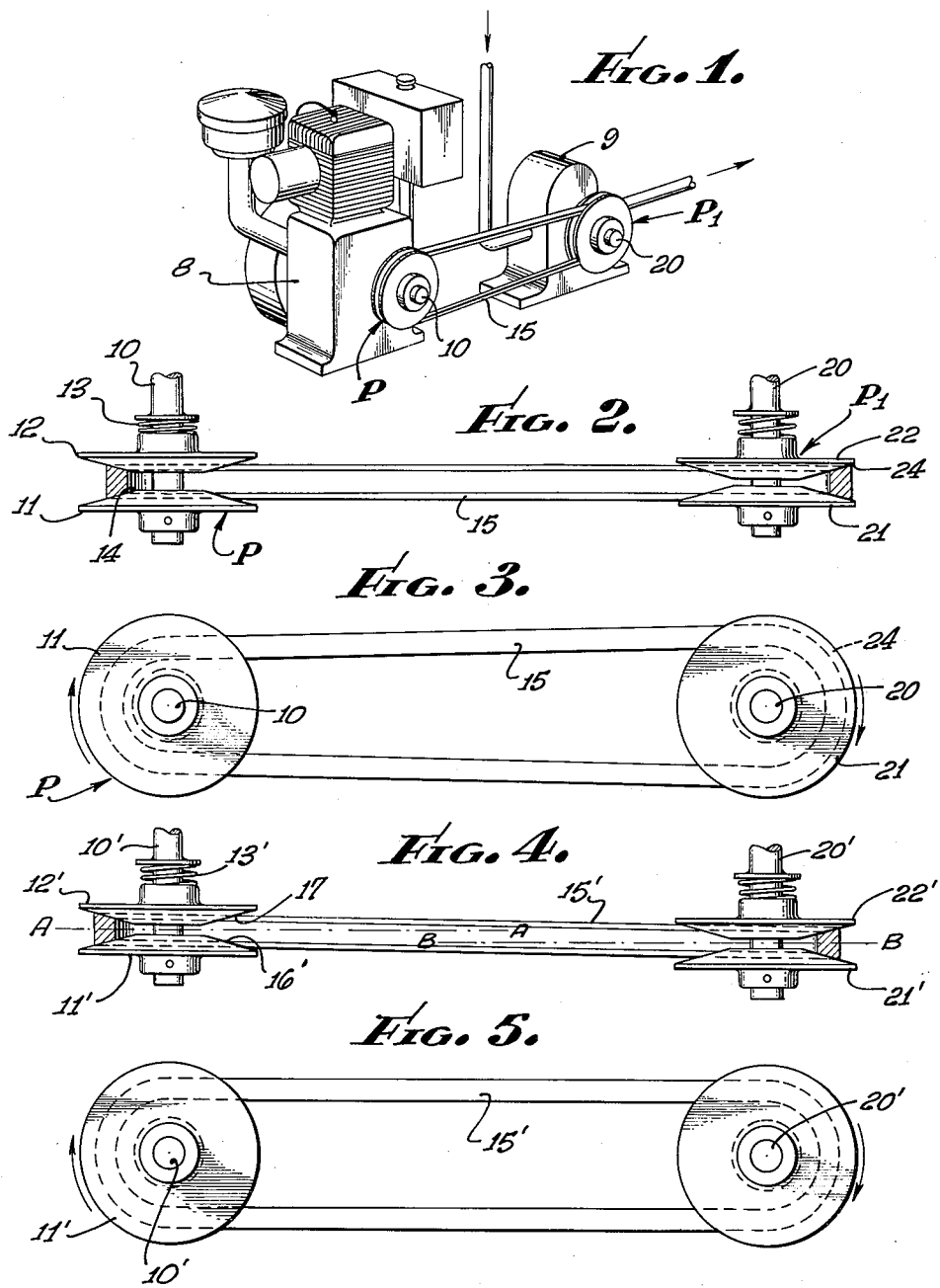
INVENTOR.
PHILIP S. OSBORNE
BY Miketta and Glenny
ATTORNEYS.

Aug. 1, 1961    P. S. OSBORNE    2,994,228
SELF-REGULATING PULLEY TRANSMISSION SYSTEM
Filed Oct. 9, 1958    2 Sheets-Sheet 2
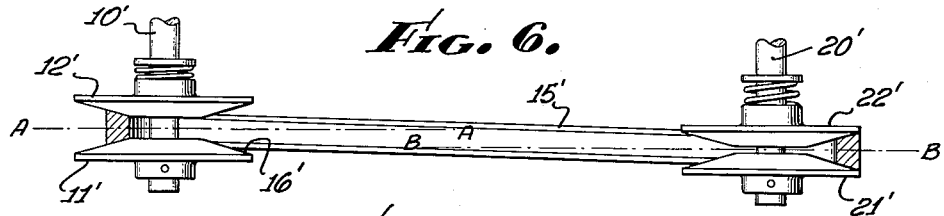
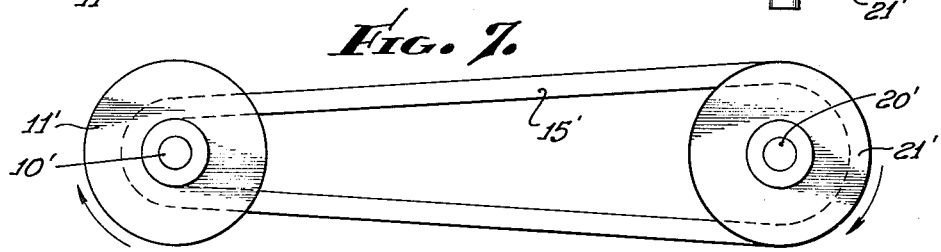
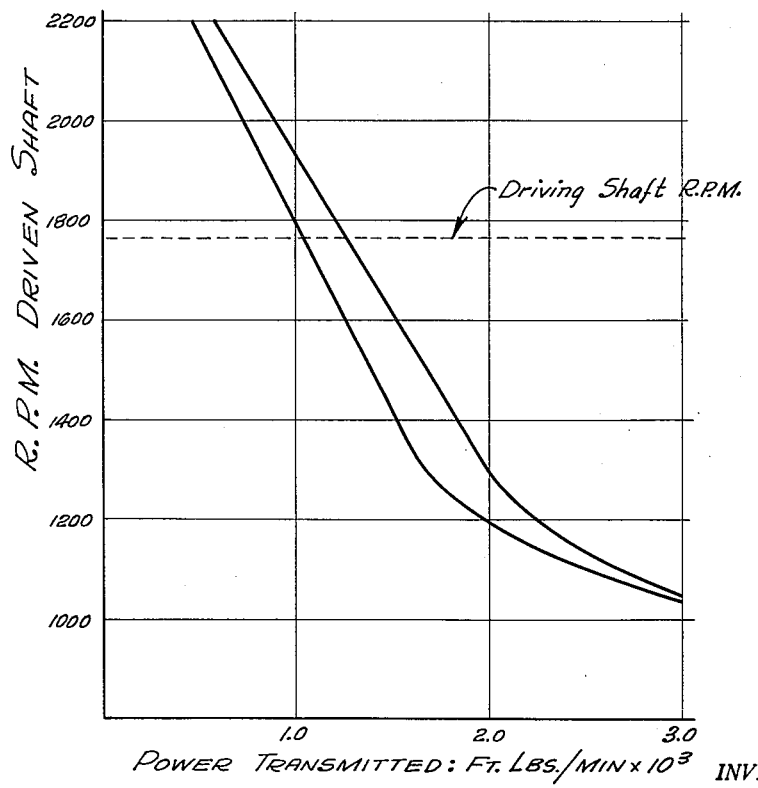
INVENTOR.
Philip S. Osborne
BY Miketta and Glenny
ATTORNEYS.

United States Patent Office 2,994,228
Patented Aug. 1, 1961

2,994,228
SELF-REGULATING PULLEY TRANSMISSION SYSTEM
Philip S. Osborne, Los Angeles, Calif., assignor to Osborne Associates, Los Angeles, Calif., a partnership
Filed Oct. 9, 1958, Ser. No. 766,342
7 Claims. (Cl. 74—230.17)

This invention relates to a simple and effective arrangement of elements whereby the normal mode of operation of a cone-type pulley drive is radically changed and such drive converted into a self-adjusting, variable speed drive or transmission which utilizes the source of power most effectively without the use of extraneous or added controls.

There are a great many instances and numerous power-driven devices in which a small motor (either of the internal combustion type or electrical) is used to drive a driven shaft, element, pump, or other device by means of a belt drive. In most of these instances cone-type pulleys are used with a V-type belt; in many instances the cone-type pulleys are of the variable type wherein one flange or face is firmly mounted to the shaft and the other flange spring-loaded toward the fixed flange so that the diametrical position of the V-belt on such pulley may vary from a position relatively close to the axis of rotation (at which time the spring-loaded flange is spaced from the fixed flange) to a diametrical position of the V-belt near the outer circumference of the pulley (at which time the spring-loaded flange is almost at its closest approach to the fixed flange). Variable cone-type pulleys of this character are well-known and although different methods of construction are employed they are similar to those illustrated in prior patents such as No. 2,173,661 and No. 2,191,200.

In such prior drives, employing variable, cone-type pulleys under normal load conditions, the V-type belt assumes a position adjacent the outer periphery of the pulley on the driven shaft and a position adjacent the mid-diameter or adjacent the innermost or smallest diameter on the driving pulley. It is impossible to realize a mechanical advantage in proportion to the load on the driven shaft with such an arrangement. Some attempts have been made to vary the ratio between driving and driven pulleys by complicated arrangements of levers, clutches, tensioning devices and other extraneous control means, but these have not been found satisfactory and are troublesome. Moreover, it is to be remembered that variable, cone-type pulley drives of the character herein referred to are ordinarily employed on relatively simple devices wherein low horse powers are employed, as for example, in motor scooters, light material-handling devices, spray pumps for agricultural use, paint sprays, etc.

The present invention is directed to an arrangement of variable, cone-type pulleys whereby the ratio between the speeds of driving and driven shafts is automatically varied by a self-adjusting change in the diametric position of the belt on the pulleys in accordance with load change on the driven shaft. This is accomplished without the use of extraneous controls or devices and thereby permits most effective utilization of the source of power, particularly where the load on the driven shaft is frequently varied by reason of varying output of a pump, variations in terrain traversed by a motor scooter, etc. In other words, a substantially constant energy in foot pounds per revolution may be delivered to a driven shaft from a normally constant speed driving shaft by the use of simple, variable, cone-type pulleys and a V-belt.

The present invention is based upon the discovery that by the use of variable, cone-type pulleys on driving and driven shafts, each of such pulleys having an axially movable, spring-loaded flange, spring-loaded in the same direction, and a V-type belt of appropriate length, a self-adjusting, control-free transmission may be obtained by displacing the medial belt plane of the pulley on the driven shaft from the medial belt plane of the pulley on the driving shaft in the direction of the fixed flange of the driven pulley an appropriate distance which is a function of the width of the V-type belt. With the elements positioned as hereinbefore stated, it will be found that the diametric position of the belt on the pulleys will automatically vary in accordance with load changes on the driven shaft. This automatic belt transmission system delivers substantially constant power or energy under wide differences in load on the driven shaft without resorting to slippage of belt at low speeds or at high torque without the use of centrifugal clutches and other inefficient, complicated and expensive devices or expedients.

It is an object of the present invention, therefore, to disclose and provide a simple and effective self-adjusting power transmission system employing variable cone-type pulleys and V-type belts.

An object of the present invention is to provide a novel power transmission ssytem in which variable cone-type pulleys are arranged with fixed pulley elements facing in the same direction and in axial displaced relation.

Another object of this invention is to disclose a self-adjusting pulley-type power transmission system wherein a driving pulley and a driven pulley are so arranged that a pulley belt extending therebetween is disposed at an angle with respect to a medial pulley plane normal to the axes of the pulleys.

Many other objects and advantages of this invention will be readily apparent from the following description of the drawings in which an exemplary embodiment of the invention is shown.

In the drawings:
FIG. 1 is a perspective view of an engine and pump connected by a belt and pulley power transmission system.
FIG. 2 is a fargmentary schematic plan view showing a well-known pulley system of the prior art.
FIG. 3 is a side view of the well-known pulley system shown in FIG. 2.
FIG. 4 is a fragmentary plan view schematically illustrating a pulley-type power transmission system embodying this invention and under a constant load condition.
FIG. 5 is a side view of FIG. 4.
FIG. 6 is a fragmentary plan view of the pulley-type system shown in FIGS. 4 and 5 showing the system under conditions of increasing load.
FIG. 7 is a side view of FIG. 6.
FIG. 8 is a chart showing a curve giving the relationship between power transmitted to revolutions per minute of a driven shaft in a transmission system of this invention and wherein the driving shaft is rotated at a selected constant speed.

Inasmuch as the invention is applicable to any transmission between a driving shaft and a driven shaft, the description given hereinafter will not be limited to any particular device but will be directed only to the essential elements and relationships therebetween. FIGS. 2 and 3 more or less schematically illustate the relationship between a driving shaft 10 connected to a source of power, such as a motor 8 (FIG. 1), and a driven shaft 20 connected to a suitable pump 9 or other device. The driving shaft is provided with a variable cone-type pulley P having a fixed flange 11 and an axially movable, rotatable flange 12 which is spring-biased or urged toward the fixed flange 11 by means of a biasing spring 13. The driven shaft 20 is similarly provided with a variable cone-type pulley P₁ having a fixed flange 21 and a spring-biased flange 22.

In accordance with prior practice (to which FIGS. 2 and 3 are directed) the two pulleys P and $P_1$ are positioned with their fixed flanges 11 and 21 in the same plane transverse to the axis of shafts 10 and 20; and the movable flanges are actuated by some external means (not shown) such as the torque-responsive cam and roller of Patent 2,178,661 or external levers or other devices. Without such external actuating means and under normal load conditions, a belt 15 may assume the position indicated in FIG. 3, that is, with the driving shaft rotating in the direction of the arrow and the lower lay of said belt being under tension; the belt 15 closely approaches the innermost portion of the cone at 14 on the driving shaft and assumes a position at 24 closely adjacent the outer periphery on the pulley mounted on the driven shaft. Since this is the normal position of the belt under normal load conditions, it is quite evident that any increase in load on the driven shaft 20 will either stall the motor and driving shaft 10 or tend to throw the upper lay of the belt 15 off and out of contact with the pulley on the driven shaft.

FIGS. 4 and 5 represent an exemplary arrangement of the elements in accordance with the present invention which results in an automatic, control-free, variable speed transmission. By referring to FIG. 4 it will be noted that the driving shaft 10' again carries a variable, cone-type pulley including a fixed flange 11' and an axially movable, spring-biased flange 12' urged toward the fixed flange by means of the spring 13'. Similarly, the driven shaft 20' also carries a variable cone pulley having the fixed flange 21' mounted thereon and the axially movable flange 22' spring-biased toward the fixed flange 21'. It may be further noted that the axially movable flanges 12' and 22' are both spring-biased in the same direction.

Attention is specifically called to the fact that the fixed flange 21' on the driven shaft 20' is not in the same plane as the fixed flange 11' on the driving shaft 10'. Although both flanges lie in planes perpendicular to the axis of rotation of the two parallel driving and driven shafts and in planes parallel to each other, the fixed flange 21' on the driven shaft 20' is displaced from the plane occupied by fixed flange 11' on the driving shaft, and in the direction in which the movable flanges are biased. A medial plane passing through the belt 15' in the position occupied by such belt on the pulley mounted on the driving shaft is indicated at A—A; a medial plane through the belt on the pulley mounted on the driven shaft 20' is indicated at B—B and indicates the displacement of the pulley on the driven shaft with respect to the pulley on the driving shaft.

The position of the belt 15' in the arrangements illustrated in FIGS. 4 and 5 is the position of the belt when the driven shaft is under normal load conditions. This is attained by the use of a belt which is of a length correlated to the spacing of the axes of the driving and driven shafts and the diameters of the two pulleys thereon. It may be noted that in the drawings (as in actual and usual practice) the pulleys are of the same diameter. The belt interconnecting said pulleys is of a length adapted to assume a minimum pitch diameter contact with one pulley and concurrently a maximum pitch diameter contact with the other pulley. Under normal load conditions, as illustrated in FIGS. 4 and 5, the lower lay of the belt 15' will engage the inclined cone surface 16 of the fixed flange 11' slightly before engagement with the inclined cone surface 17 of the axially movable flange 12' of the pulley on the driving shaft and will therefore assume a position of contact under normal load conditions along a diametric path of the same diameter as on the driven pulley, this being clearly shown in FIG. 5. This normal or constant load position illustrated in FIG. 5 is to be compared with the prior art position under normal load illustrated in FIG. 3.

When the load on the driven shaft 20' is increased, the belt 15' will automatically change its position on the pulleys and assume the position illustrated in FIG. 6. As there shown, the belt 15' has now moved toward the axis of the driving shaft and concurrently has moved away from the axis on the driven shaft. It will be evident that since the driving shaft may be assumed to be connected to a constant speed type motor, a different driving ratio has been automatically attained; the driven shaft is being driven at a lower r.p.m. but a mechanical advantage has been gained and substantially the same torque is now being developed in the driven shaft that was generated under normal load conditions illustrated in FIG. 5. As soon as the excessive load on the driven shaft 20' is reduced, the belt will automatically return to the normal load position illustrated in FIG. 5; as the load on the driven shaft is reduced even further or eliminated, the belt will automatically assume a position adjacent the outer periphery of the pulley on the driving shaft and approach the smallest diametric position on the pulley carried by the driven shaft.

The operation and function of the pulley transmission system generally described above may be described in detail as follows. Under conditions of increasing load, feeding of the lower and tension lay of belt 15' first upon inclined cone surface 16' of fixed flange 11' at an area adjacent the periphery of flange 11' introduces a frictional component force acting between the side face of the belt and surface 16'. This frictional force introduces, under conditions of increasing load on the driven shaft, additional tension in the tension lay of belt 15' passing around the driving pulley which tends to urge radially inwardly that portion of the belt. The spring loaded, movable element 12' is urged away from the fixed element so that the belt 15' may assume minimum pitch diameter at the driving shaft.

At the driven shaft, the slack upper lay of belt 15' is first fed upon the biased flange 22'. Under increasing load conditions, rotation of driven shaft 20' tends to slow down, and the slack upper lay of belt 15' tends to feed peripherally outwardly of biased flange 22' to assume a maximum pitch diameter. The biased flange 22' tends to urge the pulley belt radially outwardly and at the same time moves toward fixed flange 21'. It is important to note that a change or shifting in position of belt 15' under increasing load occurs not only in a transverse direction, that is, with maximum pitch diameter at the driven shaft, but also in an axial direction, that is, the medial plane of the belt at the driving pulley has shifted in the direction of the movable flange 12' and the medial plane of the belt at the driven pulley has shifted in the direction of the fixed flange 21'. Such axially directed shifting of belt 15' increases the angle of the tension lay with respect to such medial planes and thus the frictional components of force at the driving fixed flange 11' are increased. Thus, such transverse and axial shifting of the belt under conditions of increasing load produces an effective mechanical advantage for automatic self-regulation of the pulley transmission system to varying load conditions.

Under decreasing load conditions, substantially a reverse operational sequence takes place. A transverse shift of belt 15' occurs in the direction of the driving shaft so that maximum pitch diameter of the belt may be assumed at the driving shaft; minimum pitch diameter being assumed at the driven shaft. Tension in the tension lay is reduced and as it feeds first upon the fixed flange 11', the belt tends to climb outwardly on the cone surface 16. As the lateral shift occurs, an axial shift also takes place in that the medial plane of the driving pulley belt portion moves in the direction of the fixed flange 11' and the medial plane of the driven pulley belt portion moves in the direction of the movable flange 22'. Thus, the offset space between said medial planes is reduced and the angle of the tension lay of the belt with respect to the driving pulley is reduced, and the resultant mechanical advantage is decreased.

It will thus be noted that the power transmission system described above is responsive to load changes through force components acting and being varied at the side faces of the pulley and the fixed flanges, such force components being derived from the character or extent of a load upon the driven shaft and by the biasing force of the springs at different stages of deflection which urge the movable flanges toward the fixed flanges. Thus, as the load is taken by the driven shaft and the frictional force components come into action, it will be readily apparent that a differential in force is provided between the dricing and the driven shafts. Such force differential acts to compensate for variation in load and to provide a self-adjusting pulley transmission system.

FIG. 8 represents the results actually obtained by the arrangement herein disclosed. The driving shaft was operated at 1750 r.p.m. (indicated by the horizontal dash line) and the normal load conditions transmitted 1250 foot pounds per minute to the driven shaft. As the load was increased, the r.p.m. of the driven shaft automatically dropped, as indicated by the upper curve, but it will be noted that when the r.p.m. of the driven shaft dropped to 1400, the amount of power transmitted thereto by the driving shaft increased to about 180 foot pounds per minute; when the r.p.m. of the driven shaft dropped to 1200 as a result of increased loading, the power transmitted rose to 2250. When the load on the driven shaft was reduced below normal, the speed of the driven shaft increased from its normal speed of 1750 to 2000 r.p.m. but at that point only 950 foot pounds per minute of power were transmitted by the constant speed driving shaft.

The area between the solid line curve and the dash line curve appearing on FIG. 8 represents the approximate operational range of the particular test unit from which these determinations were made. It is to be understood that the results given in FIG. 8 are simply illustrative of one arrangement which employed three-inch pulleys on one-half inch shafts on ten-inch centers, the driving shaft being connected to a one-third horse power motor.

Those skilled in the art will recognize that the appropriate length of belt 15' is less than that normally selected for a pulley drive system using a standard juxtaposed arrangement of vari-cone pulleys. It should also be noted that the axial displacement, misalignment or off-setting of the driven pulley with respect to the driving pulley may effectively vary between a distance of 0.5 and 1 times the width of the belt in the direction of spring loading. For example, a misalignment of 1/8" to 3/8" with pulley (3") axes at 18" on center has operated with good results. Such misalignment usually should not exceed approximately the width of the belt.

It should also be noted that the fixed pulley elements have their inclined cone-shaped surfaces facing in the same direction and that the belt 15' feeds its tension lay to the driving pulley at a slight angle with respect to the medial belt plane of the driving pulley and in the same direction as that in which the fixed pulley elements face. The belt 15' shifts transversely and axially in response to varying load conditions. The pulley-type, control-free, variable speed transmission described above is immediately responsive to changes from low load to high load and usually responds to such load changes in virtually the same time as required to apply a load to the driven shaft. The pulley system is somewhat more slowly responsive to changes from full load to low load conditions.

Various changes and modifications may be made in the transmission system described above and all such changes coming within the scope of the appended claims are embraced thereby.

I claim:

1. A simple power transmission which is self-adjusting to variation in load on a driven shaft, comprising, in combination with a driving shaft associated with a power source and a virtually parallel driven shaft: a variable cone-type pulley on the driving shaft and on the driven shaft, each of said pulleys having a fixed flange and an opposing axially movable spring-loaded flange, said pulleys being mounted on their respective shafts with the movable flanges spring-loaded in the same direction; and a V-type belt operably interconnecting said pulleys, said belt being of a length adapted to assume a minimum diameter contact with one pulley and a maximum diameter contact with the other pulley, the fixed flange of the driven pulley being displaced from the medial belt plane of the driving pulley a distance sufficient to displace the medial line of the belt on said driven pulley in the direction of said spring loading with respect to the medial belt plane of the belt on the driving pulley, in all operating, interconnecting positions of the belt on said pulleys, whereby the ratio between speeds of driving and driven shafts is automatically varied by self-adjusting change in diametric position of the belt on said pulleys in accordance with load change on the driven shaft.

2. A self-adjusting power transmission as stated in claim 1, wherein the fixed flange of the driven pulley is displaced from the medial belt plane of the driving pulley a distance of between 0.5 and 1.0 the width of the belt in the direction of said spring loading.

3. A simple power transmission which is self-adjusting to variation in load on a driven shaft, comprising in combination with a driving shaft associated with a power source and a virtually parallel driven shaft: pulley means on each of said driving and driven shafts, each of said pulleys having a fixed flange and an opposed axially movable flange, said pulleys being mounted on their respective shafts with the fixed flanges in corresponding positions; spring means under compression for each movable flange biasing the same toward its associated fixed flange; and belt means operably interconnecting said pulleys, said belt having a length adapted to assume minimum pitch diameter contact with one pulley and maximum pitch diameter contact with the other pulley, the fixed flange of the driven pulley being displaced axially from the corresponding fixed flange of the driving pulley so that the tension lay of said belt means will feed upon said fixed flange of the driving pulley and at an angle thereto and in the direction which said fixed flanges face, whereby in all operating interconnecting positions of the belt means on said pulleys the ratio between speeds of driving and driven shafts is automatically varied by self-adjusting change in pitch diameter position of the belt on said pulleys in accordance with load change on the driven shaft.

4. A pulley-type power transmission system self-adjustable to variable load conditions on a driven shaft, comprising in combination with a driving shaft in parallel relation to the driven shaft: a variable cone-type pulley on each of said driving and driven shafts, each of said pulleys including a fixed pulley element and an opposed axially movable pulley element, said fixed elements having cone surfaces facing in the same direction and displaced axially with respect to each other; a spring member biasing each movable element toward its associated fixed element and a belt means operably interconnecting said pulleys and including a lay normally under tension in operation, said tension lay being inclined to a plane normal to said axes of said shafts and moving toward said driving pulley and in the direction to which said fixed pulley elements are facing.

5. A system as stated in claim 4 wherein said belt means is provided a length adapted to assume a minimum pitch diameter contact with one pulley and simultaneously a maximum pitch diameter contact with the other pulley.

6. A system as stated in claim 4 wherein the displacement axially of said fixed pulley elements with respect to each other does not exceed approximately the width of the pulley belt.

7. A self-adjustable power transmission system including driving and driven shafts in spaced parallel relation, comprising in combination: a single pulley means on each of said shafts, each pulley means including a fixed pulley element and an axially movable pulley element, a spring biasing each movable pulley element toward its associated fixed pulley element, said fixed pulley elements facing in the same direction and being offset axially with the fixed pulley element on the driving shaft ahead of the fixed pulley element on the driven shaft with respect to the direction said fixed elements face; and a pulley belt having side faces and interconnecting said pulley means, said belt having a length providing minimum pitch diameter contact with one pulley and maximum pitch diameter contact with the other pulley, said offset relation of said fixed pulley elements providing frictional engagement of one side face of said belt with the fixed pulley element on said driving shaft under all conditions of power transmission, whereby changes in load on said driven shaft produce a force differential between the engagement of said belt with the pulley elements at each pulley means for self-adjustment of said power transmission to said load.

References Cited in the file of this patent

UNITED STATES PATENTS

| | | |
|---|---|---|
| 2,173,661 | Perrine | Sept. 19, 1939 |
| 2,623,400 | Davis | Dec. 30, 1952 |